Nov. 30, 1954  J. V. FREDD  2,695,458
HYDRAULICALLY OPERATED FEELER HEAD FOR TUBING CALIPERS
Filed Dec. 3, 1952  2 Sheets-Sheet 1
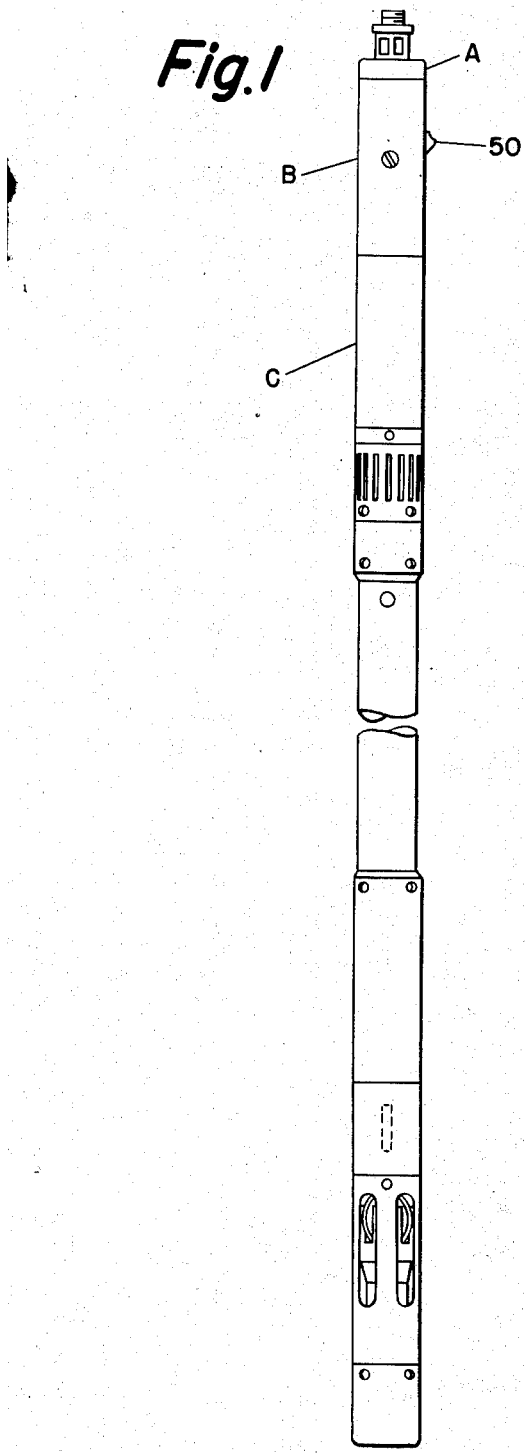
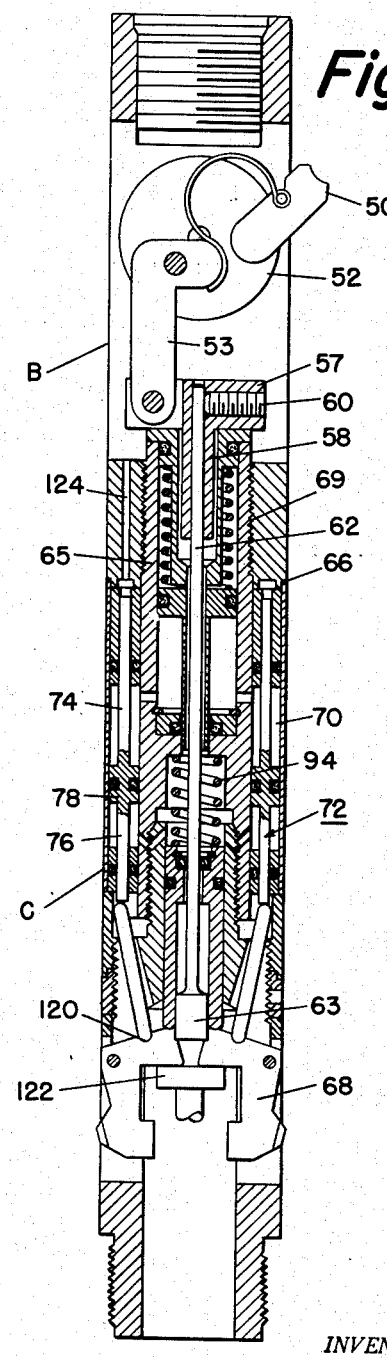
INVENTOR.
JOHN V. FREDD
BY Robert O. Spindle
ATTORNEY Nov. 30, 1954

J. V. FREDD 2,695,458

HYDRAULICALLY OPERATED FEELER HEAD FOR TUBING CALIPERS

Filed Dec. 3, 1952

INVENTOR.
JOHN V. FREDD
BY
ATTORNEY

2,695,458

HYDRAULICALLY OPERATED FEELER HEAD FOR TUBING CALIPERS

John V. Fredd, Dallas, Tex., assignor to Otis Pressure Control, Inc., Dallas, Tex., a corporation of Delaware Application December 3, 1952, Serial No. 323,869

6 Claims. (Cl. 33—178)

The present invention relates in general to tube calipering devices and more particularly to the feeler mechanisms of such devices which contact the tubing wall in the calipering process.

Calipering devices for which the disclosed mechanism or feeler head is designed require centering in the tubing during the calipering operation in order to produce a correctly charted record. Any substantial deviation from longitudinal movement along the center line of the tube affects the stylus or chart operation and incorrectly records the internal tubular surface.

In the known caliper art, it is common practice to use springs as the feeler loading mechanism. To achieve the necessary sensitivity for accurate and rapid calipering, a plurality of springs are used to urge the several elements into operating position. These springs must be selected so as to exert substantially equal force for all positions of expansion or contraction, and frequently balanced in opposition with other springs of like or different strength. These requirements are difficult to meet in manufacture, and must be carefully maintained under operating conditions. It is, therefore, an object of this invention to simplify the construction of caliper feeler mechanisms and increase the accuracy of operation of this sub-combination for general use in calipering operations.

It is a principal feature of this invention to provide a feeler head for use with calipering devices which are lowered or "dropped" as a unit by a suitable wire line into tubing containing fluids under pressure and effect a continuous record of the internal surface configuration of the tubing as the device passes therethrough. Such devices are most frequently used in calipering tubing used in well bore operations, and are of the self-contained type, including the stylus and chart assemblies as part of the mechanism. The feeler head disclosed here, however, may be used in any tubing calipering operation and with other recorder combinations either proximate or remote as will be readily understood. The apparatus of this invention, although shown in the drawings as forming a part of a complete caliper of special design following the apparatus disclosed in my Patent No. 2,596,924, issued May 13, 1952, is intended as a distinct sub-combination of such instruments and may be incorporated with many similar devices.

This mechanism comprises a plurality of feeler elements, each being capable of independent movement into pits or depressions encountered in passing through tubing during a calipering operation. Collectively the elements are constantly urged outwardly from the supporting body member to peripherally engage the tubular wall in feeling contact. This constant engagement is of necessity light in pressure to avoid undue wear, but must be sufficiently firm and peripherally complete to maintain the feeler head in central alignment within the tube. Any deviation from this center alignment will transmit a false measurement of the correct radial measurement in the tube.

The spring operated feeler devices developed in the above-numbered patent and the associated art give satisfactory results. However, in the disclosed mechanism the response of a single spring or other resilient member as the actuator, is supported by a balanced hydraulic system. The necessity for carefully calibrated springs is eliminated. It is, therefore, a further object of this invention to provide an improved feeler head for calipering devices which will maintain the proper position during the calipering operation under all conditions.

These and other objects will be evident from a reading of the following description of the device where reference is made to the accompanying drawing in which:

Figure 1 is an elevational view of a complete calipering device.

Figure 2 is a sectional elevation of the upper section of Figure 1 including the feeler head in locked position.

Figure 3:
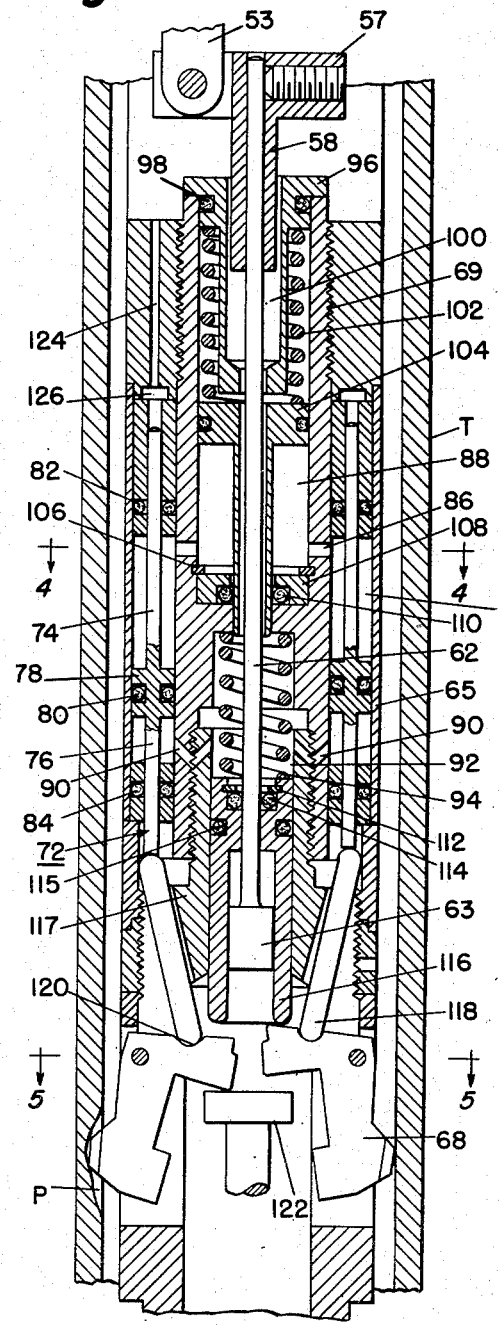
Figure 3 is an enlarged vertical section of the feeler head elements in operation.

To illustrate one form of device with which the improved feeler head as here disclosed can be used to advantage, Figure 1 shows a completely self-contained well bore caliper. For a full understanding of the whole calipering device and its operation, reference is made again to the previously noted patent. As the sub-combination here described and claimed refers only to the feeler head mechanism, this disclosure will be confined to that part of the apparatus. Reference will be made, as required, to the movement transmitting elements to and from the feeler head, but will not include other structure. In addition to simplifying the description, this disclosure is thus limited because the feeler head as described may be used with like calipers and similar mechanisms and is not devised solely as an improvement for one form of device.

Referring now to Figure 1, the top sub A is the connection by means of which the caliper is suspended in the tubing. A release assembly B is advantageously placed between the sub A and the feeler head assembly C to connect the two and to withhold the feelers from the calipering operation until released by the operation. The feeler head assembly C represents our main consideration and will be described in detail. Below this section are housed the remaining elements of the mechanism which record the feeler movements and drive the recording elements. Further reference to these elements is not necessary to an understanding of the feeler mechanism and will not be made.

Figure 2 is a sectional view of the two sections B and C referred to above. The release mechanism shown here in section B includes an outwardly projecting engaging element or dog 50 arranged to transmit movement through the cylindrical discs 52 and the release link 53 to the head 57 of the release plunger 58. Set screw 60 holds the locking piston 62 in operating engagement with the release plunger 58 and positions the head 63 in relation to the feelers 68 as shown. In Figure 2 the feelers 68 are locked while in Figure 3 the head 63 has been lifted and the feelers released to engage the inner wall of the tubing T.

Comparison with Patent No. 2,596,924 will show the above elements of the release mechanism B to be as disclosed here. The component parts of section C, the feeler head section, now to be discussed are similar in some instances, but sufficiently different in the combination to require detailed description. The structural modifications required for hydraulic operation and the resulting improvements will be discussed in detail.

Figure 4:
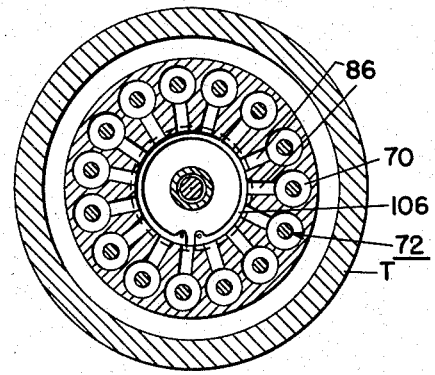
Figure 4 is a cross-section of Figure 3 on line 4—4.

Returning to Figure 2, the thread 69 of the release assembly B engages a like thread on the feeler head body 65 and unites these two sections in operating relation. Below the threaded connection, the feeler head body 65 is machined to form a tight connection with section C by the shoulder structure as at 66. Circumferentially spaced in the body 65, as shown in Figure 4, cylinders 70 are drilled to receive the pistons 72.

The pistons 72 each include guide rod sections 74 and 76 extending above and below the cross-head 78 as indicated in Figure 3. To make the cross-head 78 responsive to the movement of the feelers 68 yet sufficiently in sealed engagement to transmit pressure variations hydraulically, each cross-head is divided into upper and lower contact areas between which is mounted a sealing ring 80. The guide rod sections 74 and 76 are operably positioned by seals 82 and 84 respectively, fashioned like the cross-head with a seal held in relation to the movable piston member. Circumferentially disposed in the feeler section body, radially drilled holes 86 as shown in Figures 3 and 4 transmit hydraulic pressures between the upper portion of the cylinders 70 and the fluid reservoir 88. A like plurality of holes 90 deflected downwardly then upwardly connect the lower portions of the cylinders 70 to the liquid space 92 additionally positioning the centering spring 94. Thus two distinctive pressure volumes are connected on opposing faces of each of the cross heads 78 slidably operating in the cylinders 70.

In the center of the feeler head body 65 the locking piston 62 extends from the release plunger 58 downwardly to the head 63 which is in immediate proximity with the feeler fingers 68. This locking piston passes through the two mentioned spaces namely the fluid reservoir 88 and the centering spring space 92. The section of the feeler head traversed by the locking piston includes, in addition to the reservoir 88 and liquid storage space 92, additional pressure storing and transmitting sections and actuating elements necessary to the improved operation of this sub-combination, which will be carefully described in detail.

Beginning at the release plunger 58, the adjacent longitudinally drilled section forming the upper part of the reservoir 88 as shown is closed by the bushing 96 which is sealed by ring 98 at the top of the body member 65. The bushing 96 engages the feeler body 65 and for purposes of operation is fixed relative to the plunger 58. This bushing guiding the release plunger 58, forms an additional pressure reservoir 100 within itself as shown. A resilient member 102 is illustrated as a spring which forms the operating source of energy in the otherwise balanced hydraulic system to be fully described later, and is retained in operating position between the bushing 96 and the plunger 104. A lock ring 106 is let into the body member as shown to retain the seal ring 108 and O ring 110 in operating contact with the plunger 104 as it slides vertically in the feeler section.

Sufficient clearance is allowed in the sliding engagement between the locking piston 62 and the release plunger 58, and the lower part of bushing 96 and plunger 104 positioned as shown in Figure 3 to permit the transmission of fluid therebetween for proper operation. These clearances are reduced to a tighter sliding engagement where the piston 62 passes through the centering plunger 116 and the unobstructed transmission of fluid is stopped there.

The centering spring 94 is the next element shown in Figures 2 and 3 also concentrically disposed around the locking piston 62. The space 92 occupied by this spring on top of the centering plunger 116 is sealed by a ring 112 and O ring 114 against leakage about the piston 62. Another sealing ring 115 encircles the external periphery of the centering plunger 116 and seals in the bore of the lower section 117 of the feeler head. The spring 94 is positioned to abut a fixed partition in the feeler body as shown and constantly urges the centering plunger 116 into regulating engagement with the feelers 68 as shown in both the locked and operating positions in Figures 2 and 3.

Figure 5:
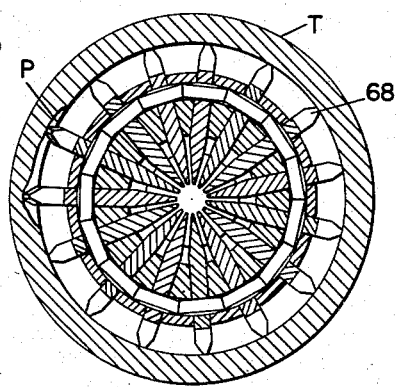
Figure 5 is a cross-section of Figure 3 on line 5—5.

As is here evident and as has been explained fully in the patent of reference, the centering plunger 116 constantly exerts equal pressure on all feeler fingers maintaining the caliper in proper alignment within the tubing. Individually each feeler finger is urged outwardly to engage the tubular wall by the feeler rods 118 connecting the individual pistons 72 with the feelers 68 notched as at 120 to receive the feeler rods. The pivotally suspended feelers 68 circumferentially positioned relative to each other, as shown in Figure 5, are free to engage a motion transmitting element 122 indicated here as a means to record the feeler finger operation and not as part of the feeler head.

Prior to discussing the operation of the disclosed apparatus to emphasize its advantages and resultant improvement over the art, it is fitting to emphasize that the system is pressure balanced. By this is meant that the well pressures constantly affecting the moving elements of tubular calipers are reduced in their effect by directing these pressures to counteract themselves within the body of the instrument. The distribution of equalizing well pressures is completed by admitting this pressure to the top of the piston guides 74 effectively opposing the like pressure affecting the guide rod sections 76. Several holes 124 are drilled through section B to admit the pressure to a channel 126 machined to contact the peripherally arranged cylinders 70. It is evident that the necessary equalizing pressure is then effective as a balance on the top of the piston guides 74.

To aid in understanding the operation of the feeler head as a sub-combination, reference is made to all the figures in the attached drawing, and particularly to Figures 2 and 3. In these two views, the former showing the feeler fingers locked in the non-calipering position is in sufficient detail to support a broad description of the general relationship of cooperating elements. The second detailed figure, number 3, is enlarged sufficiently to permit tracing the pressure balance and unbalance through the device during the calipering operation. Further, Figure 3 shows the relationship of the elements while operating and will be used more extensively for reference.

The caliper as shown in Figure 1, and as previously stated, is one form of device with which the feeler mechanism of this invention can be used. It is set forth only as an example and is not intended to limit the usefulness of this sub-combination in broader applications. Consequently, the description of operation will be limited to the feeler head and will not repeat the details of the calipering instrument already well known from the patent of reference.

Referring to the figures of the drawing and particularly to Figure 3, the operation of the device will be disclosed. The feeler head is prepared for operation by completely filling the openings in the body 65 with the hydraulic medium, usually a light lubricating oil. It will be evident that plug openings can be provided for filling the spaces in the feeler body or it can be assembled in a body of the liquid. This presents no problem.

After being filled, it is assembled as part of the device it will actuate and is transferred to the locus of operations. Normally this device will be used for calipering under pressure conditions for which the feeler head is primarily designed. Consequently, it will, for the greater part of its operation, be subjected to pressured fluids completely encasing it. As this presents the greatest problem affecting feeler mechanisms, the device will be described as operating under these conditions.

The calipering device being assembled, the feelers 68 are closed into the body of the instrument and engaged by the locking piston head 63. This locks the device in the retracted position as shown in Figure 2. A position is assumed by dog 50 of the release mechanism which permits downward movement of the caliper in the tube to be calipered without disturbing the retracted feeler position.

The effect of retracting to the position in which the feelers 68 are now locked is to urge the pistons 72 upwardly in the cylinders 70. The upper portion of the cylinders about the guide portions 74 is decreased in volume, while the lower portion about the guides 76 is increased. The liquid in the decreased volumes is transferred to the reservoir 88 through the holes 86. The plunger 104 lifts against the spring 102 increasing the pressure on the liquid body in the reservoir. Additional liquid flows from the space 92 through the holes 90 to fill the increased volume in the lower portions of the cylinders. Thus the internal pressures are unbalanced and the device is inserted in the tubing for the calipering operation.

After the depth is reached for the beginning of the operation, upward movement engages the dog 50 in a collar or other connector between tubing lengths and the dog is forced downwardly. Rotation of discs 52 lifts the release link 53 and the release plunger 58. As the locking piston 62 is fastened to the release plunger 58, the upward movement is transmitted thereto, and the plunger head 63 is lifted free of engagement with the feelers 68. Figure 3 illustrates the position now assumed by the elements of the feeler head as the calipering operation begins.

The pressure within the tubing T, Figure 3, is considered as entirely surrounding the feeler head as shown. The surfaces of the operating elements completely exposed to the pressure condition are pressure balanced from all directions and will operate uninterruptedly. Such elements as the feelers 68 and the feeler rods 118 are evidently such exposed members.

As the spaces within the body of the feeler head 65 are completely filled with liquid, the surrounding well pressure is transmitted as a balanced pressure throughout the major part of the mechanism. As described above, the pistons 72 at the top and bottom are pressure balanced. The pressure transmitted downwardly through reservoir 100 is admitted to the centering spring space 92 and outwardly through holes 90 to the lower part of the cylinders 70 about the guide rod section noted as 76. The filling liquid in the fluid reservoir 88 transmitted through the holes 86 to the upper part of the cylinders 70 around the piston portion 74 is the unbalancing pressure source, operating as follows.

In order to deliver the necessary operating force to urge the pistons 72 into individual balanced contact with the feeler fingers 68, the spring 102 is maintained in compression pushing the piston 104 downwardly. The loading required to establish this operating force in the spring 102 and the reservoir 88 may be established either mechanically or hydraulically. This initial operating pressure is equally distributed to the upper portions 74 of the circumferentially positioned pistons 72 by means of the liquid medium in the reservoir 88 and through the connecting ports 86. In response to the pressure entering the cylinders above the crossheads 78, all the piston rods are urged downwardly with equal force against the feeler rods 118 and the feeler fingers 68. This requires an unbalance of force over the pressure existing in the well and is supplied by the compression of spring 102. That this spring is the only force operating for this purpose is evident when it is understood that the top of the plunger 104 is exposed to the well pressures thus removing any additional requirements from the spring 102.

Below the cross-head 78 around the lower piston portion 76, within the cylinders and the space 92, the external pressure is present in these feeler head spaces, but not the additional pressure which exists above the pistons due to the effect of the spring 102. As this external pressure is also added to the top of the piston guides 74 being admitted through the holes 124 and the space 126, the unbalance of the spring 102 is the only effective force. The external pressure admitted below the pistons and to the centering spring space 92 removes this portion of the device from the hydraulic operation by balancing the pressure. The centering plunger 116 is urged against all the feeler arms to retain the centering alignment by the force of the centering spring 94. The mass of the plunger 116 free of any pressure is also effective as it is balanced by the external well pressure applied to both the top and bottom of the plunger alike.

When a feeler 68 extends outwardly into a collar or pit P in the tubing as indicated in Figure 3, the associated piston or pistons 72 move downwardly in the cylinders 70. This movement releases the supporting pressure which holds the spring urged central piston 104 in balance. As this spring 102 is always in compression, the piston follows the pressure release and immediately reestablishes the hydraulic balance throughout the piston-feeler system. Any movement of the pistons resulting from extension or retraction of the feelers is pressure compensated in the reservoir 88 by the movement of the spring-urged plunger 104.

Within the feeler head described, a single spring is used to urge the individual feelers outwardly into calipering engagement. The hydraulic medium is made effective by using a reservoir of compensating volume. By the expedient of such a reservoir and the direction of external pressures to balance their effect, a sensitive mechanism of usable size has been developed. Although the external pressures existing in the well bore liquids have been channeled through the body of the feeler head in well defined paths, it seems obvious that the sole purpose is to develop operating pressure by means of the plunger operating in the reservoir as the actuating element and remove unequal opposing forces by balancing the pressures which become effective on the other elements from outside sources. This is possible by either more open or closed construction than that shown, or by greatly modifying the device to exclude all paths of pressure travel except the cylinders and the reservoir. It is intended therefore that the present invention is to be limited only by the scope of the attached claims, and broadly applied within the limits of the application of the disclosed principles.

In summary, therefore, the above disclosure presents a feeler head for calipering purposes in which the individual feeler finger pressure is balanced at all times. The elimination of separate springs for the necessary finger operation facilitates maintaining alignment in the tubing during the calipering operation necessary for correct charting. Additionally the removal of the moving separate springs, and substitution of the hydraulic system to cooperate with resilient members of general application assists in the accuracy of the caliper operation. By mechanically or hydraulically loading the spring-plunger combination for initial operations, the wear on the feelers can be controlled to greater advantage than using independently calibrated springs. Finally all movement through the feeler head for calipering is compensatory within the hydraulic means giving smooth accurate operation as a single element in contrast with the irregular movement of plural forces as in spring structures.

The invention claimed is:

1. A feeler head for calipering mechanisms comprising a body adapted to be moved through tubing, a multiplicity of independently movable feelers pivotally mounted upon said body, a multiplicity of cylinders peripherally arranged to extend longitudinally of said body spaced and positioned in cooperating relation with said feelers, piston means in said cylinders engaging said feelers to independently urge the same into calipering engagement, a spring urged centering plunger positioned concentrically of said cylinders in contact with the feelers uniformly urging the same into aligning engagement, a reservoir in the body adapted to support a liquid, pressure transmitting means connecting said reservoir with each cylinder, and a spring-urged plunger in said reservoir adapted to exert hydraulic pressure on the piston means.

2. In an internal tube wall calipering device adapted to be passed through an extended length of tubing, the combination comprising an elongated housing, a multiplicity of independently movable feelers spaced apart circumferentially of said housing and adapted for independent lateral movement between said housing and the tube wall being calipered, and a multiplicity of movement-transmitting means, one for each of said feelers, operable independently of each other to effect outward movement of the respective feelers; said movement-transmitting means comprising pistons, one for each feeler, an hydraulic medium through which said pistons are operable to effect said outward movement to the respective feelers and thus maintain all of them with equal and uniform pressure in contact with the tube wall, and a device exerting pressure constantly upon said hydraulic medium and thus effective to move outward, independently of the other feelers, any feeler encountering a depression in the tube wall.

3. In an internal tube wall calipering device adapted to be passed through an extended length of tubing, the combination comprising an elongated housing, a multiplicity of independently movable feelers spaced apart circumferentially of said housing and adapted for independent lateral movement between said housing and the tube wall being calipered, and a plurality of movement-transmitting means, one for each of said feelers, operable independently of each other to effect outward movement of the respective feelers; said movement-transmitting means comprising pistons, one for each feeler, a liquid reservoir communicating independently with the respective pistons and adapted to contain a liquid by means of which said pistons are independently operable to press the respective feelers outwardly, a device adapted, in the upward movement of the caliper, to exert pressure constantly upon the liquid in the reservoir to thereby cause said liquid to maintain each piston independently in said outward pressure relation with its respective feeler, and means, operable in the downward movement of the caliper in the tubing, to hold the feelers inward out of contact with the tubing wall and retract said pistons against the hydraulic pressure tending to effect outward movement of the feelers.

4. A feeler head for calipering mechanisms comprising a body, independently movable feelers mounted peripherally of said body, individual piston means in said body operably engaging each of said feelers, a reservoir in said body adapted to contain a liquid and in pressure transmitting connection with said piston means, plunger means in said reservoir resiliently urged to maintain operating pressure on each of said feelers through their respective piston means, and a second resiliently urged plunger means, and a second resiliently urged plunger means externally of the reservoir uniformly urging all of said feelers into aligning contact with the tubing.

5. A feeler head for calipering mechanisms comprising a body adapted to move through tubing, a multiplicity of independently movable feelers pivotally mounted upon said body, individual piston means longitudinally movable in said body cooperatively engaging each of said feelers to urge the same into individual calipering contact, a liquid-containing reservoir in pressure-transmitting communication with each of said piston means, resilient means in said reservoir pressuring the liquid to actuate the individual feelers through the respective piston means, and a spring-urged centering plunger externally of the reservoir uniformly urging all of said feelers outwardly into engagement with the normal tubing wall and positioning said feelers for independent operation by said piston means whenever a tubing wall abnormality is encountered.

6. A feeler head for calipering mechanisms comprising a body adapted to move through tubing, a multiplicity of independently movable feelers pivotally mounted upon said body, individual piston means longitudinally movable in said body cooperatively engaging each of said feelers to urge the same into individual calipering contact, a liquid-containing reservoir in pressure-transmitting communication with each of said piston means, resilient means in said reservoir pressuring the liquid to actuate the individual feelers through the respective piston means, a spring-urged centering plunger externally of the reservoir uniformly urging all of said feelers outwardly into engagement with the normal tubing wall and into position for the independent calipering actuation of said piston means whenever a tubing wall abnormality is encountered, and latching means restraining said feelers against the combined piston and centering plunger pressures until released for calipering operation.

References Cited in the file of this patent

UNITED STATES PATENTS

| Number | Name | Date |
|---|---|---|
| 1,676,248 | Byrant | July 10, 1928 |
| 2,150,070 | Kregecz | Mar. 7, 1939 |
| 2,399,305 | Agnew et al. | Apr. 30, 1946 |
| 2,518,663 | Chaney et al. | Aug. 15, 1950 |
| 2,596,924 | Fredd | May 13, 1952 |

FOREIGN PATENTS

| Number | Country | Date |
|---|---|---|
| 509,718 | Great Britain | July 20, 1939 |